United States Patent
Hashiguchi

(10) Patent No.: US 10,228,523 B2
(45) Date of Patent: *Mar. 12, 2019

(54) OPTICAL MODULE

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/690,995

(22) Filed: Aug. 30, 2017

(65) Prior Publication Data

US 2018/0143385 A1     May 24, 2018

(30) Foreign Application Priority Data

Nov. 22, 2016    (JP) ................. 2016-226517

(51) Int. Cl.
    *G02B 6/36*       (2006.01)
    *G02B 6/42*       (2006.01)
    *G02B 6/38*       (2006.01)

(52) U.S. Cl.
    CPC ......... *G02B 6/4206* (2013.01); *G02B 6/3885* (2013.01); *G02B 6/423* (2013.01)

(58) Field of Classification Search
    USPC ............... 385/31, 33, 36, 47, 88–89, 92–93
    See application file for complete search history.

(56) References Cited

U.S. PATENT DOCUMENTS

| | | | | |
|---|---|---|---|---|
| 9,086,552 B2 * | 7/2015 | Huang | .................... | G02B 6/423 |
| 9,417,414 B2 * | 8/2016 | Shimotsu | ............. | G02B 6/4201 |
| 9,726,829 B2 * | 8/2017 | Benner | ................ | G02B 6/3829 |
| 2006/0067631 A1 * | 3/2006 | Wang | ................... | G02B 6/4292 |
| | | | | 385/92 |
| 2008/0175544 A1 * | 7/2008 | Fujiwara | .............. | G02B 6/4292 |
| | | | | 385/77 |
| 2016/0161687 A1 * | 6/2016 | Rosenberg | ........... | G02B 6/4292 |
| | | | | 385/14 |
| 2017/0075082 A1 | 3/2017 | Aihara et al. | | |

FOREIGN PATENT DOCUMENTS

| | | |
|---|---|---|
| JP | 2013-140211 | 7/2013 |
| JP | 2015-219273 | 12/2015 |

* cited by examiner

*Primary Examiner* — Eric Wong
(74) *Attorney, Agent, or Firm* — Greenblum & Bernstein, P.L.C.

(57) ABSTRACT

An optical module includes a first optical block and a second optical block. The first optical block includes a base part, two extending parts which extend in a first direction, locking parts, and a first reference surface. The second optical block includes a holding part, two arm parts, spring pieces which extend in the first direction, locked parts which are formed on the spring pieces, and a second reference surface. In a state that the first optical block and the second optical block are assembled with each other, the locking parts are hooked on the locked parts, the second reference surface is pressed against the first reference surface by a spring force of the spring pieces so as to realize positioning in the assembling direction, and an optical path between the base part and the holding part is parallel to the first direction.

8 Claims, 13 Drawing Sheets

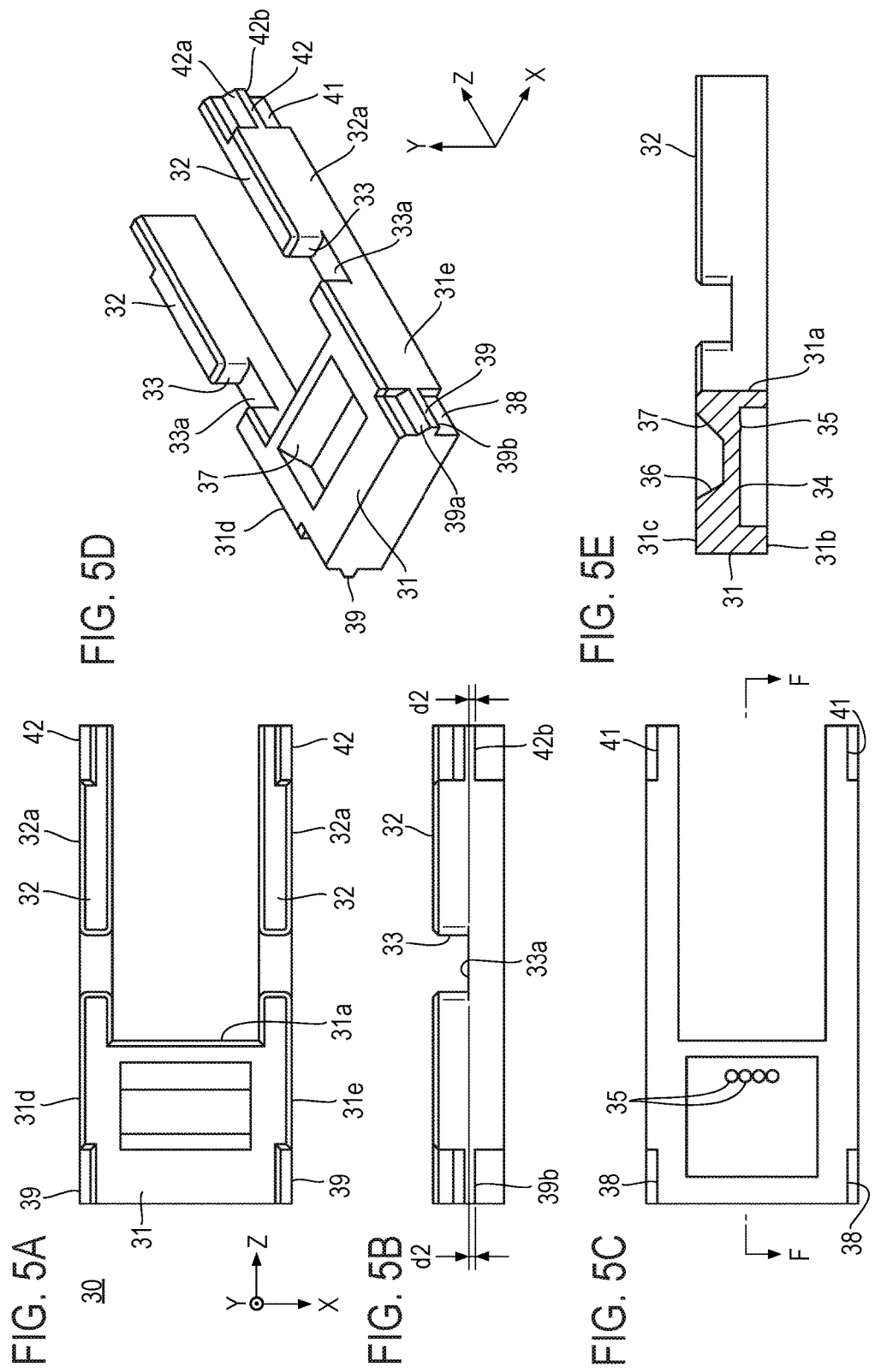

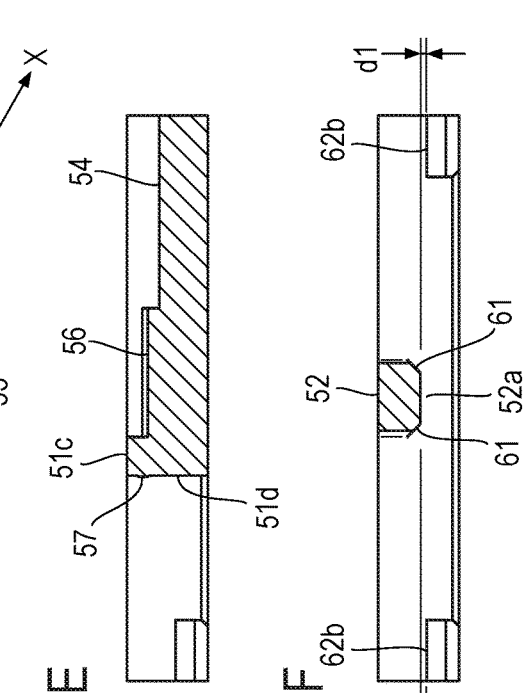
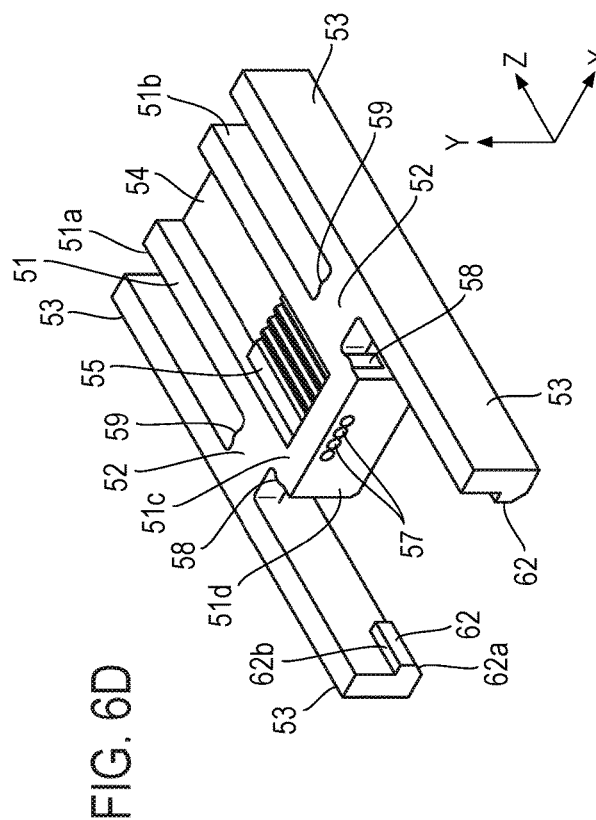
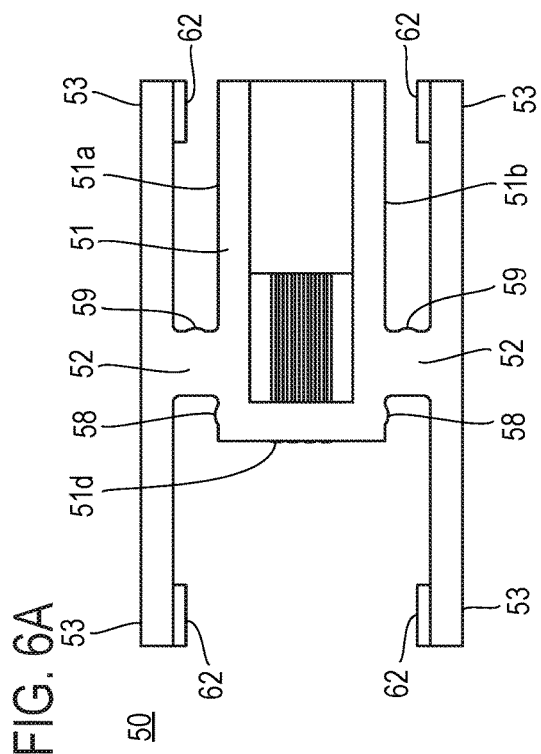

OPTICAL MODULE

TECHNICAL FIELD

The present invention relates to an optical module for optically connecting an optical fiber with an optical element such as a light emitting element and a light receiving element.

BACKGROUND ART

FIGS. 1A and 1B illustrate the configuration described in Japanese Patent Application Laid Open No. 2015-219273 as a related art example of this type of optical module. In this example, the optical module includes a first optical block 11 and a second optical block 12. The first optical block 11 is fixed on a substrate 14 on which one or more optical elements 13 are mounted. The second optical block 12 holding one or more optical fibers 15 is mounted on the first optical block 11. The number of the optical fibers 15 is generally equal to the number of the optical elements 13, and the number of the optical elements 13 is usually greater than or equal to 2.

In a state that the second optical block 12 and the first optical block 11 are interlocked, the optical elements 13 are positioned in a space 11a which is formed on a bottom surface of the first optical block 11. Lenses 11b, the number of which is equal to the number of the optical elements 13, are formed on the first optical block 11. One of the lenses 11b is positioned just above a corresponding one of the optical elements 13 in the state that the second optical block 12 and the first optical block 11 are interlocked.

The second optical block 12 includes four spring pieces 12a. The four spring pieces 12a are formed in a manner to be integrated with a main body part of the second optical block 12. A lance part 12b is formed on an end of each of the four spring pieces 12a. The second optical block 12 is pushed to the top of the first optical block 11 to fit with the first optical block 11. At this time, the lance parts 12b are hooked on an upper end of a step part 11c formed on the first optical block 11 and thus, the second optical block 12 is fixed on the first optical block 11.

A convex part 12c is formed on a bottom surface of the second optical block 12. The convex part 12c is fitted on a concave part 11d formed on an upper surface of the first optical block 11. Lenses 12d, the number of which is equal to the number of the optical elements 13, are formed on the convex part 12c. In the state that the second optical block 12 and the first optical block 11 are interlocked, an optical axis of each of the lenses 11b is accorded with an optical axis of a corresponding one of the lenses 12d. A reflection surface 12e is formed on an upper surface of the second optical block 12. The reflection surface 12e is positioned just above the lenses 12d.

The optical elements 13 are light emitting elements or light receiving elements, for example. In the case where the optical elements 13 are light emitting elements, each of the lenses 11b converts light from a corresponding one of the optical elements 13 into parallel light. Each of the lenses 12d collects the parallel light from a corresponding one of the lenses 11b. The reflection surface 12e converts travelling directions of all the light from the lenses 12d by 90°. Each of the light from the reflection surface 12e is incident on a corresponding one of the optical fibers 15. The optical fibers 15 are held by the second optical block 12. The extending directions of the optical fibers 15 are parallel to the substrate 14.

Thus, the optical module illustrated in FIGS. 1A and 1B optically connects the optical elements 13 with the optical fibers 15. In this example, an optical connection direction between the first optical block 11 and the second optical block 12 is orthogonal to a plate surface of the substrate 14. A mechanical connection direction (assembling direction) between the first optical block 11 and the second optical block 12 is also orthogonal to the plate surface of the substrate 14.

FIGS. 2A and 2B illustrate the configuration of an optical module described in Japanese Patent Application Laid Open No. 2013-140211. This optical module includes a circuit substrate 22, a housing 24, an optical fiber holding member 26, and an optical coupling member 27, in this example. Optical elements 21 are mounted on the circuit substrate 22. The housing 24 to which an end part of an optical cable 23 is fixed accommodates the circuit substrate 22. The optical fiber holding member 26 holds optical fibers 25 guided from the optical cable 23 into the housing 24. The optical coupling member 27 is fixed to the circuit substrate 22 and optically connects the optical elements 21 with the optical fibers 25. The optical fiber holding member 26 is coupled to the optical coupling member 27 by fitting a guide pin 27a into a guide hole 26a.

The optical coupling member 27 covers the optical elements 21. On a surface, which faces to the optical fiber holding member 26, of the optical coupling member 27, lenses 27b are formed. On a surface, which faces to the optical elements 21, of the optical coupling member 27, lenses (not shown) are formed. Further, a reflection surface 27c is formed on an upper surface of the optical coupling member 27.

In the case where the optical elements 21 are light emitting elements, rays of light from the light emitting elements pass through the lenses, which are not shown, to be incident on the optical coupling member 27. The reflection surface 27c reflects the rays of light incident on the optical coupling member 27. The lenses 27b optically couple the rays of light from the reflection surface 27c onto end surfaces of the optical fibers 25.

Thus, the optical module illustrated in FIGS. 2A and 2B optically connects the optical elements 21 with the optical fibers 25. In this example, an optical connection direction between the optical fiber holding member 26 and the optical coupling member 27 is parallel to a plate surface of the circuit substrate 22. A mechanical connection direction between the optical fiber holding member 26 and the optical coupling member 27 is also parallel to the plate surface of the circuit substrate 22.

As mentioned above, in the optical module illustrated in FIGS. 1A and 1B, the mechanical connection direction between the first optical block 11 and the second optical block 12 is orthogonal to the plate surface of the substrate 14. Accordingly, the optical module can be easily assembled by pushing the second optical block 12 to the top of the first optical block 11 which is mounted on the substrate 14.

However, the optical module illustrated in FIGS. 1A and 1B has the configuration in which the lance parts 12b are hooked on the upper end of the step part 11c and thus, there is a play in the assembling direction. Therefore, high positioning accuracy cannot be obtained in the assembling direction. In order to permit misregistration in the assembling direction, the optical connection direction of the optical module illustrated in FIGS. 1A and 1B is orthogonal to the plate surface of the substrate 14.

Therefore, it is necessary to form the reflection surface 12e on the upper surface of the second optical block 12.

Accordingly, right above the optical elements 13, the first optical block 11 and a part, on which the reflection surface 12e is formed, of the second optical block 12 are overlapped in a direction orthogonal to the plate surface of the substrate 14. Thus, it is difficult to configure a low-profile optical module.

In the optical module illustrated in FIGS. 2A and 2B, since each of the optical connection direction and the mechanical connection direction is parallel to the plate surface of the circuit substrate 22, the reflection surface 27c is formed on the upper surface of the optical coupling member 27 which covers the optical elements 21. Thus, the optical fiber holding member 26 and the optical coupling member 27 are not overlapped with each other right above the optical elements 21, enabling configuration of a low-profile optical module.

However, assembling of the optical module illustrated in FIGS. 2A and 2B is difficult. It is necessary to slide the optical fiber holding member 26 in an extending direction of the optical fibers 25 (that is, in a direction parallel to the plate surface of the circuit substrate 22) in assembling. Therefore, in the case where the optical fibers 25 are fixed at the end part of the optical cable 23, the optical fibers 25 need to be bent. The optical fibers 25 may be damaged due to the bending. Thus, it is impossible to easily assemble the optical module illustrated in FIGS. 2A and 2B.

SUMMARY OF THE INVENTION

An object of the present invention is to provide a low-profile optical module which can be easily assembled.

An optical module according to the present invention optically connects an optical element with an optical fiber. The optical module includes a first optical block, and a second optical block which is assembled with the first optical block.

The first optical block is an optical block which is to be mounted on a substrate on which the optical element is mounted, and the second optical block is an optical block configured to hold the optical fiber.

The first optical block includes a base part, two extending parts which are opposed to each other, and four locking parts.

The two extending parts extend from the base part in a first direction which is orthogonal to an assembling direction. The assembling direction is a direction in which the second optical block is assembled with the first optical block.

At least one concave part is formed on each upper surface of the two extending parts.

Two locking parts among the four locking parts are formed on two lateral surfaces of the base part, which are parallel to the first direction.

The other two locking parts among the four locking parts are formed on outer lateral surfaces of the two extending parts.

A reflection surface which reflects light is formed on the base part.

The reflection surface has an inclination of 45° with respect to the assembling direction.

A first reference surface which is orthogonal to the assembling direction is formed on a part of the first optical block. The part is positioned in a region surrounded by the four locking parts.

The second optical block includes a holding part which holds the optical fiber, two arm parts, four spring pieces, and four locked parts.

The two arm parts protrude from the holding part.

A direction in which each of the two arm parts extends is parallel to a second direction. The second direction is orthogonal to the assembling direction and is orthogonal to the first direction.

A direction to which one of the two arm parts extends is opposite to a direction to which the other of the two arm parts extends.

Two spring pieces among the four spring pieces extend parallel to the first direction from an end of one of the two arm parts.

A direction to which one of the two spring pieces among the four spring pieces extends is opposite to a direction to which the other of the two spring pieces among the four spring pieces extends.

The other two spring pieces among the four spring pieces extend parallel to the first direction from an end of the other of the two arm parts.

A direction to which one of the other two spring pieces among the four spring pieces extends is opposite to a direction to which the other of the other two spring pieces among the four spring pieces extends.

The four locked parts are formed on free ends of the four spring pieces.

The four locked parts have a configuration in which the four locking parts are hooked on the four locked parts in a state that the second optical block is assembled with the first optical block.

A second reference surface which is orthogonal to the assembling direction is formed on a part of the second optical block. The part is a part opposed to the first reference surface in the state that the second optical block is assembled with the first optical block.

In the state that the second optical block is assembled with the first optical block, the holding part is positioned between the two extending parts.

In the state that the second optical block is assembled with the first optical block, each of the two arm parts is accommodated in the concave part.

In the state that the second optical block is assembled with the first optical block, the second reference surface is pressed against the first reference surface by a spring force of the four spring pieces.

In the state that the second optical block is assembled with the first optical block, an optical path between the base part and the holding part is parallel to the first direction and the optical path is included in an optical path between the reflection surface and the optical fiber.

EFFECTS OF THE INVENTION

According to the present invention, the assembling direction is orthogonal to the direction (that is, the first direction) of the optical path between the second optical block and the first optical block. Accordingly, the optical module can be easily assembled only by fitting the second optical block into the first optical block along the assembling direction. The optical path between the first optical block and the second optical block is parallel to the first direction and the first optical block and the second optical block are not overlapped with each other in the assembling direction. Accordingly, a dimension in the assembling direction of the optical module is small.

BRIEF DESCRIPTION OF THE DRAWINGS

FIG. 5A is a plan view of a first optical block illustrated in FIG. 3.

FIG. 5B is a front elevational view of the first optical block illustrated in FIG. 3.

FIG. 5C is a bottom view of the first optical block illustrated in FIG. 3.

FIG. 5D is a perspective view of the first optical block illustrated in FIG. 3.

FIG. 5E is a sectional view taken along the line F-F of FIG. 5C.

FIG. 6A is a plan view of a second optical block illustrated in FIG. 3.

FIG. 6B is a left lateral view of the second optical block illustrated in FIG. 3.

FIG. 6C is a right lateral view of the second optical block illustrated in FIG. 3.

FIG. 6D is a perspective view of the second optical block illustrated in FIG. 3.

FIG. 6E is a sectional view taken along the line G-G of FIG. 6B.

FIG. 6F is a sectional view taken along the line H-H of FIG. 6B.

DETAILED DESCRIPTION OF THE EMBODIMENTS

Figure 1A:
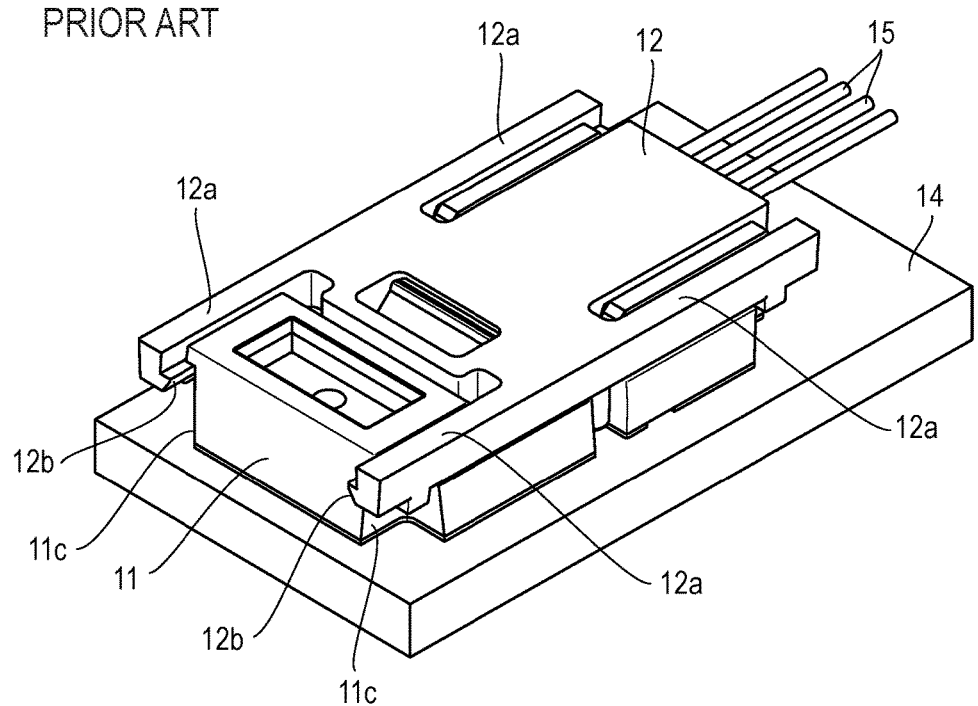
FIG. 1A is a perspective view illustrating a related art example of an optical module.
Figure 1B:
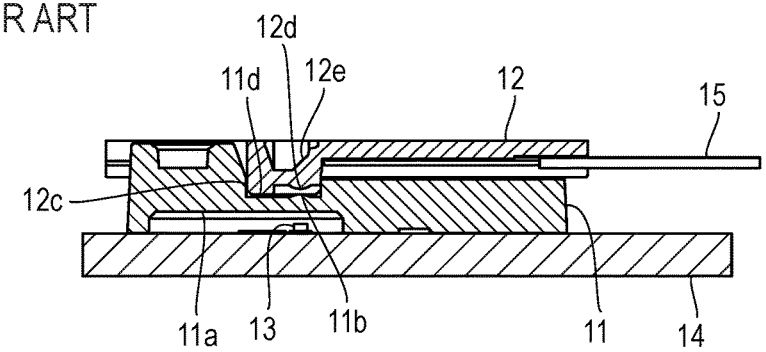
FIG. 1B is a sectional view of the optical module illustrated in FIG. 1A.
Figure 2A:
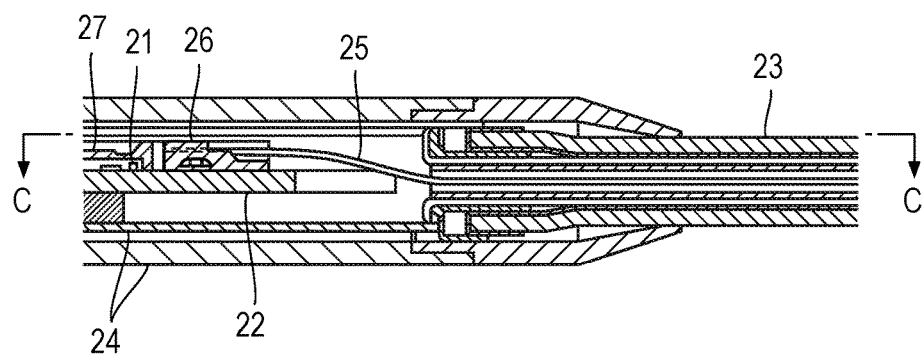
FIG. 2A is a sectional view illustrating another related art example of an optical module.
Figure 2B:
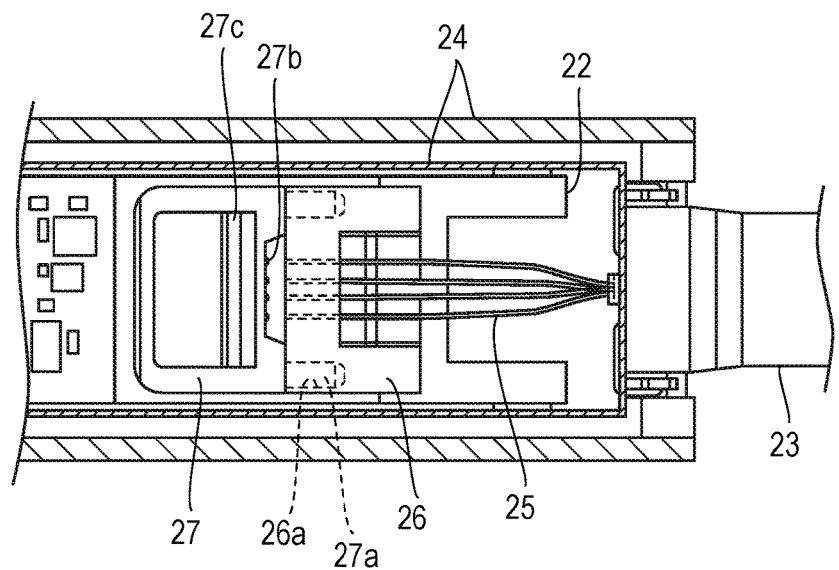
FIG. 2B is a sectional view, which is taken along the line C-C, of the optical module illustrated in FIG. 2A.

Embodiments of the present invention will be described with reference to the accompanying drawings.

First Embodiment

FIG. 3 and FIGS. 4A to 4D illustrate a state that an optical module 100 according to the first embodiment of the present invention is mounted on a substrate 200. The optical module 100 includes a first optical block 30 and a second optical block 50. FIGS. 5A to 5E illustrate the detailed configuration of the first optical block 30. FIGS. 6A to 6F illustrate the detailed configuration of the second optical block 50. The configurations of the first optical block 30 and the second optical block 50 will be first described. In the following description, two orthogonal directions which are parallel to a plate surface of the substrate 200 illustrated in FIG. 3 and FIGS. 4A to 4D are set as the X direction (the second direction) and the Z direction (the first direction), and a direction orthogonal to the plate surface of the substrate 200 is set as the Y direction (the assembling direction).

As illustrated in FIGS. 5A to 5E, the first optical block 30 includes a base part 31 having a substantially rectangular parallelepiped shape and two extending parts 32 provided in a pair. The thickness, in the Y direction, of the base part 31 is equal to the thickness, in the Y direction, of each of the extending parts 32. The two extending parts 32 extend to the Z direction from both end parts, in the X direction, of a lateral surface 31a. The two extending parts 32 are opposed to each other. The lateral surface 31a is a lateral surface, along the X direction, of the base part 31. A concave part 33 is formed on each upper surface of the two extending parts 32. The concave parts 33 are positioned near the base part 31. A bottom surface 33a of the concave part 33 is orthogonal to the Y direction.

A space 34 for accommodating one or more elements are formed on a lower surface 31b of the base part 31. Lenses 35 for light condensing are formed on a top surface of this space 34. The total number of the lenses 35 is four in this example. The four lenses 35 are aligned in the X direction. A concave part 36 is formed on an upper surface 31c of the base part 31. A reflection surface 37 which reflects light is formed on an inner surface of the concave part 36. The reflection surface 37 is positioned directly above the lenses 35.

A step part 38 which is a recess in the X direction is formed on each of two end parts of the base part 31. Each of the two end parts, on which the step parts 38 are formed, of the base part 31 is an end part of a lateral surface 31d, which is along the Z direction, and an end part of a lateral surface 31e, which is along the Z direction, of the base part 31 and further, the two end parts are two end parts which are on the opposite sides to two end parts on which the extending parts 32 are positioned. A protruding part 39 which extends in the Z direction is formed on each of the step parts 38. A surface, which faces upward in the Y direction, of the protruding part 39 is an inclined surface 39a. A lower surface 39b which is on the opposite side to the inclined surface 39a is orthogonal to the Y direction.

A step part 41 which is a recess in the X direction is formed on each of tip parts, in the Z direction, of the two extending parts 32. The step part 41 is formed on an outer lateral surface 32a of the extending part 32. The outer lateral surfaces 32a are positioned on the extensions of the lateral surfaces 31d and 31e of the base part 31. A protruding part 42 which extends in the Z direction is formed on each of the two step parts 41. A surface, which faces upward in the Y direction, of the protruding part 42 is an inclined surface 42a. A lower surface 42b which is on the opposite side to the inclined surface 42a is orthogonal to the Y direction.

A material of the first optical block 30 having the above-mentioned configuration is resin which transmits light. The first optical block 30 is formed by resin molding.

As illustrated in FIGS. 6A to 6F, the second optical block 50 includes a holding part 51 having a substantially rectangular parallelepiped shape, two arm parts 52 provided in a pair, and four spring pieces 53. One of the two arm parts 52 protrudes outward from a lateral surface 51a, which is along the Z direction, of the holding part 51, while the other of the two arm parts 52 protrudes outward from a lateral surface 51b, which is along the Z direction, of the holding part 51. Two spring pieces 53 extend from an end of one arm part 52 in the +Z direction and the −Z direction. The other two spring pieces 53 extend from an end of the other arm part 52 in the +Z direction and the −Z direction. Upper surfaces of the arm parts 52, upper surfaces of the spring pieces 53, and an upper surface 51c of the holding part 51 are on the same plane. The thickness, in the Y direction, of the holding part 51 is equal to the thickness, in the Y direction, of the spring piece 53. The thickness, in the Y direction, of the arm part 52 is smaller than the thickness, in the Y direction, of the holding part 51.

A concave part 54 is formed on the upper surface 51c of the holding part 51. The concave part 54 extends from one end of the upper surface 51c to the vicinity of the other end of the upper surface 51c in the Z direction. A step part 55 is formed on an inner end side of the concave part 54. The step part 55 is a little higher than a bottom surface of the concave part 54. V grooves 56 which extend in the Z direction are formed on the step part 55. The total number of the V grooves 56 is four in this example. Four lenses 57 are formed on a lateral surface 51d of the holding part 51. The lateral surface 51d is a lateral surface which is along the X direction. The four lenses 57 are positioned on virtual extension lines of the four V grooves 56.

The two arm parts 52 are formed on parts close to the lateral surface 51d (that is, a light incidence and emission surface) of the holding part 51. A protrusion 58 having a rib shape is formed on each of the lateral surfaces 51a and 51b of the holding part 51. The protrusion 58 extends in the Y direction. One protrusion 58 is positioned on a part, which is closer to the lateral surface 51d than the arm part 52, on the lateral surface 51a. The other protrusion 58 is positioned on a part, which is closer to the lateral surface 51d than the arm part 52, on the lateral surface 51b. Two protrusions 59 each having a rib shape are formed on two lateral surfaces of the two arm parts 52. The protrusion 59 extends in the Y direction. The lateral surface on which the protrusion 59 is formed is a lateral surface along the X direction, which is farther from the lateral surface 51d of the holding part 51. A lower surface 52a of the arm part 52 is orthogonal to the Y direction. Large chamfered surfaces 61 are formed on both ends, in the Z direction, of the lower surface 52a of the atm part 52, as illustrated in FIG. 6F. A bottom part of the protrusion 59 is also an inclined surface due to the chamfered surface 61.

The width, in the X direction, of the spring piece 53 is smaller than the width, in the Y direction, of the spring piece 53. That is, a sectional shape of the spring piece 53 is a rectangle, a long side of which is parallel to the Y direction. A lance 62 protrudes in the X direction from an inner lateral surface of a free end of each of the spring pieces 53. The lance 62 extends in the Z direction. The lance 62 is positioned on a lower end, in the Y direction, of the inner lateral surface. A surface, which faces downward in the Y direction, of the lance 62 is an inclined surface 62a. An upper surface 62b which is on the opposite side to the inclined surface 62a is orthogonal to the Y direction.

A material of the second optical block 50 is resin which transmits light. The second optical block 50 is formed by resin molding.

Figure 7:
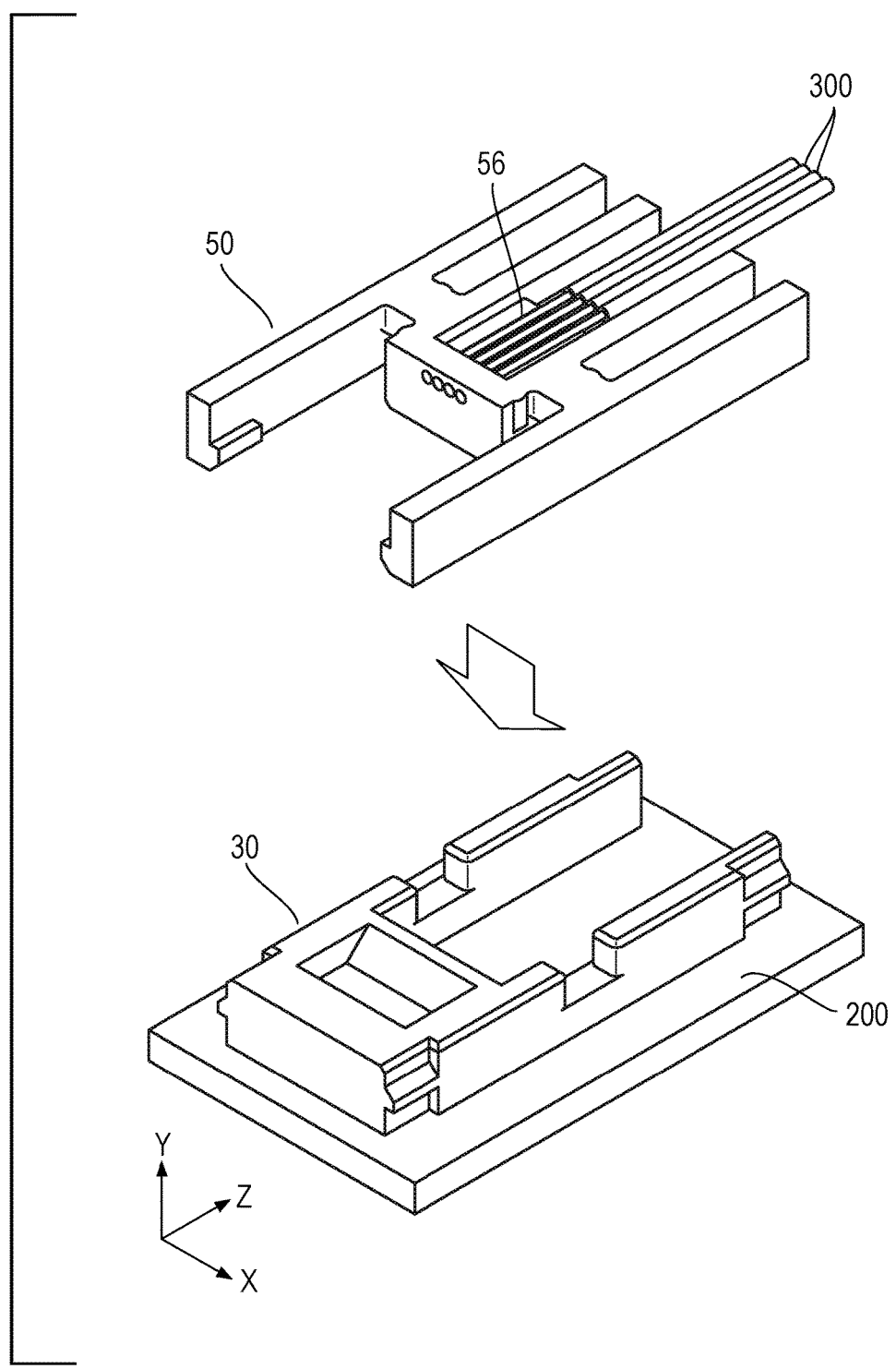
FIG. 7 illustrates assembly of the optical module illustrated in FIG. 3.

As illustrated in FIG. 7, optical fibers 300 are mounted on the four V grooves 56. The optical fibers 300 are positioned by the V grooves 56.

The first optical block 30 is fixed on the substrate 200 with an adhesive, for example. The second optical block 50 which holds the optical fibers 300 is pushed to the top (that is, an upper part in the Y direction) of the first optical block 30 to fit with the first optical block 30 , as illustrated in FIG. 7.

As a result, the optical module 100 is mounted on the substrate 200 as illustrated in FIG. 3 and FIGS. 4A to 4D.

Figure 4A:
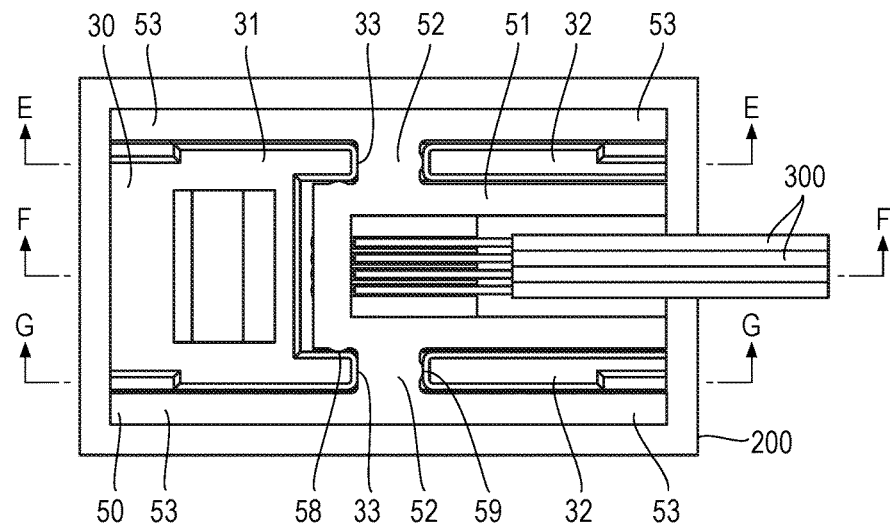
FIG. 4A is a plan view of the optical module which is in the state illustrated in FIG. 3.
Figure 4B:
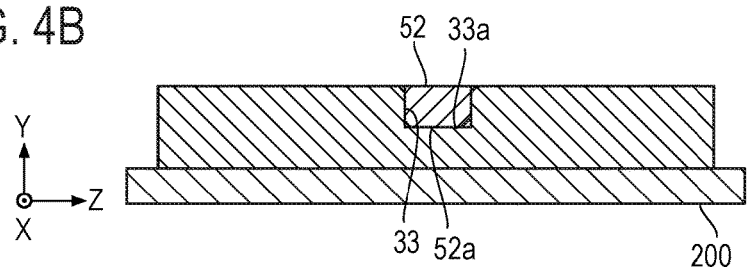
FIG. 4B is a sectional view taken along the line E-E of FIG. 4A.
Figure 4C:
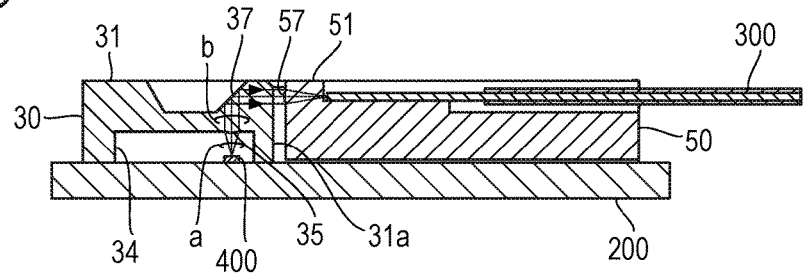
FIG. 4C is a sectional view taken along the line F-F of FIG. 4A.

As illustrated in FIG. 4C, optical elements 400 are mounted on the substrate 200. In a state that the first optical block 30 is fixed on the substrate 200, the lenses 35 are positioned just above the optical elements 400. That is, each of optical axes of the optical elements 400 is accorded with an optical axis of a corresponding one of the lenses 35. In this state, the optical elements 400 are accommodated in the space 34 which is formed in the first optical block 30.

Figure 3:
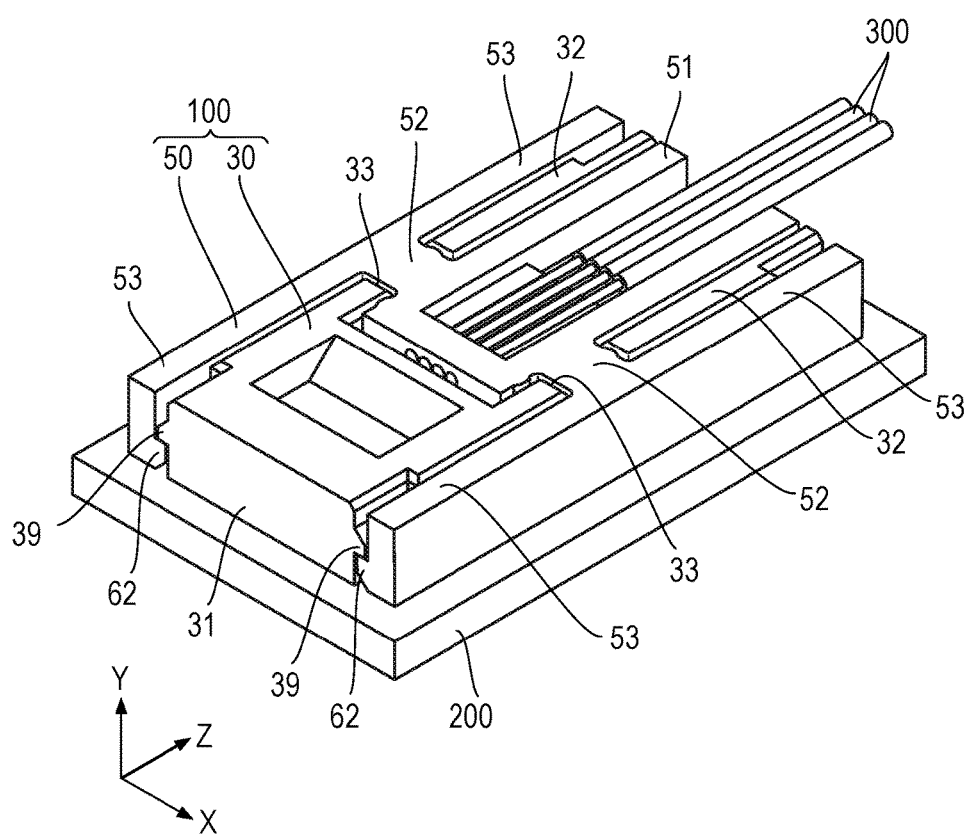
FIG. 3 is a perspective view illustrating a state that an optical module according to a first embodiment of the present invention is mounted on a substrate.
Figure 4D:
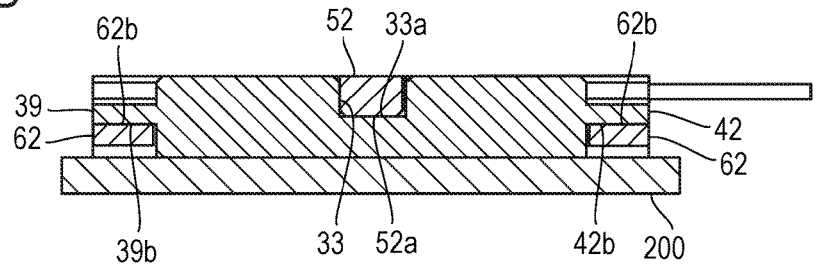
FIG. 4D is a sectional view taken along the line G-G of FIG. 4A.

When the second optical block 50 is fitted into the first optical block 30, the lances 62 are hooked on the protruding parts 39 and 42, as illustrated in FIGS. 3 and 4D. As a result, the second optical block 50 is fixed on the first optical block 30. When the second optical block 50 is fitted into the first optical block 30, a part, on which the protrusions 58 are formed, of the holding part 51 is pressed between the two extending parts 32, as illustrated in FIG. 4A. As a result, a position, in the X direction, of the second optical block 50 with respect to the first optical block 30 is determined. Further, as illustrated in FIG. 4A, the arm parts 52, on which the protrusions 59 are formed, are pressed into the concave parts 33. As a result, a position, in the Z direction, of the second optical block 50 with respect to the first optical block 30 is determined. The configuration for positioning in the X direction is not limited to the configuration of the first embodiment and the configuration for positioning in the Z direction is not limited to the configuration of the first embodiment.

Further, as illustrated in FIGS. 4B and 4D, the lower surfaces 52a of the two arm parts 52 are pressed against the bottom surfaces 33a of the concave parts 33 by the spring force of the four spring pieces 53. As a result, a position, in the Y direction, of the second optical block 50 with respect to the first optical block 30 is determined. In order to obtain a required spring force (pressing force), the dimension dl, in the Y direction, from the lower surface 52a of the arm part 52 to the upper surface 62b of the lance 62 (see FIG. 6F) is smaller than the dimension d2, in the Y direction, from the bottom surface 33a of the concave part 33 to each of the lower surfaces 39b and 42b of the protruding parts 39 and 42 (see FIG. 5B) by a predetermined amount.

By the above-described positioning, the optical module 100 is assembled with high accuracy. Accordingly, the optical elements 400 mounted on the substrate 200 are optically connected to the optical fibers 300 held by the second optical block 50, with high optical coupling efficiency (that is, with low loss). The optical element 400 is a light emitting element such as a vertical cavity surface emitting laser (VCSEL) or a light receiving element such as a photo diode (PD). In this example, four optical elements 400 are optically connected to the four optical fibers 300.

FIG. 4C illustrates travel of light in the case where the optical elements 400 are VCSELs. The lens 35 converts emission light "a" emitted from the optical element 400 into parallel light "b". The reflection surface 37 having an angle of 45° with respect to the plate surface of the substrate 200 (that is, having an inclination of 45° with respect to the assembling direction) bends the traveling direction of the parallel light "b" by 90°. The light from the reflection surface 37 is emitted from the lateral surface 31a of the base part 31. The parallel light emitted from the lateral surface 31a travels through a space to reach the lens 57 of the holding part 51. The parallel light is collected by the lens 57 to be incident on the end surface of the optical fiber 300. Thus, the optical elements 400 are optically connected to the optical fibers 300 via the lenses 35 and 57 and the reflection surface 37, in this example. The incidence direction or the emission direction of light between the base part 31 of the first optical block 30 and the holding part 51 of the second optical block 50 is the Z direction which is parallel to the plate surface of the substrate 200. Thus, in the state that the second optical block 50 is assembled with the first optical block 30, an optical path between the base part 31 and the holding part 51 is parallel to the Z direction (the first direction) and this optical path is included in an optical path between the reflection surface 37 and the optical fibers 300.

According to the optical module 100 described above, the mechanical connection direction between the first optical block 30 and the second optical block 50 is orthogonal to the plate surface of the substrate 200. Accordingly, the optical module 100 can be easily assembled.

The optical connection direction between the first optical block 30 and the second optical block 50 is parallel to the plate surface of the substrate 200. In the state that the first optical block 30 and the second optical block 50 are assembled with each other, the second optical block 50 is settled between the bottom surface of the first optical block 30 and a top surface of the first optical block 30. Thus, the height dimension of the optical module 100 is determined depending on the height dimension of the first optical block 30. In other words, the height dimension of the optical module 100 is not affected by the height dimension of the second optical block 50. Thus, the optical module 100 which is lower-profile than that of the related art can be realized.

In the first embodiment, the protruding parts 39 and 42 are formed as locking parts on the lateral surfaces of the first optical block 30 and the lances 62 are formed as locked parts, which are hooked on the locking parts, on the spring pieces 53 of the second optical block 50. However, the configurations of the locking part and the locked part are not limited to the configurations described in the first embodiment. As one example of other configurations, the configuration in which a locking part is a protruding part and a locked part is a hole is also allowable.

In the first embodiment, light between the base part 31 of the first optical block 30 and the holding part 51 of the second optical block 50 is parallel light which is parallel to the plate surface of the substrate 200. That is, optical coupling in the first embodiment is based on space propagation of parallel light. Therefore, positioning accuracy, in the Z direction, between the base part 31 and the holding part 51 does not necessarily have to be high. Accordingly, the configuration in which the arm parts 52 of the second optical block 50 are pressed into the concave parts 33 of the first optical block 30 is not required.

Since an error is hardly generated in the X direction which is not the mechanical connection direction (assembling direction) of the first optical block 30 and the second optical block 50, positioning accuracy in the X direction is naturally favorable. Accordingly, the configuration in which the holding part 51 of the second optical block 50 is pressed between the extending parts 32 of the first optical block 30 is not required.

However, positioning accuracy in the Y direction between the base part 31 and the holding part 51 needs to be high so as to obtain high optical coupling efficiency. In general, positioning accuracy in the Y direction is poor due to play in the Y direction which is the mechanical connection direction (assembling direction) of the first optical block 30 and the second optical block 50. However, the second reference surface (the lower surfaces 52a of the arm parts 52), in the Y direction, of the second optical block 50 is pressed against the first reference surface (the bottom surfaces 33a of the concave parts 33 of the first optical block 30), in the Y direction, of the first optical block 30 by the spring force of the spring pieces 53 in the first embodiment. Accordingly, the positioning accuracy in the Y direction is extremely favorable. The couple of the first reference surface and the second reference surface is not limited to the couple of the bottom surface 33a of the concave part 33 of the first optical block 30 and the lower surface 52a of the arm part 52.

Hereinafter, the second to seventh embodiments for performing positioning by using other parts will be described with reference to FIGS. 8 to 11. Here, components corresponding to those of the first embodiment will be given the identical reference characters and duplicated description thereof will be omitted.

Second Embodiment

Figure 8A:
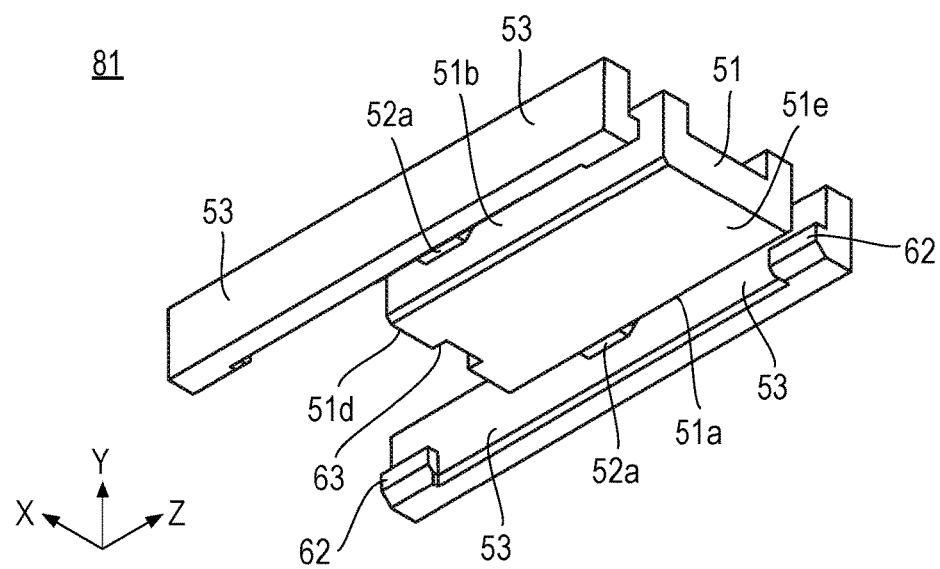
FIG. 8A is a perspective view illustrating a second optical block included in an optical module according to a second embodiment.
Figure 8B:
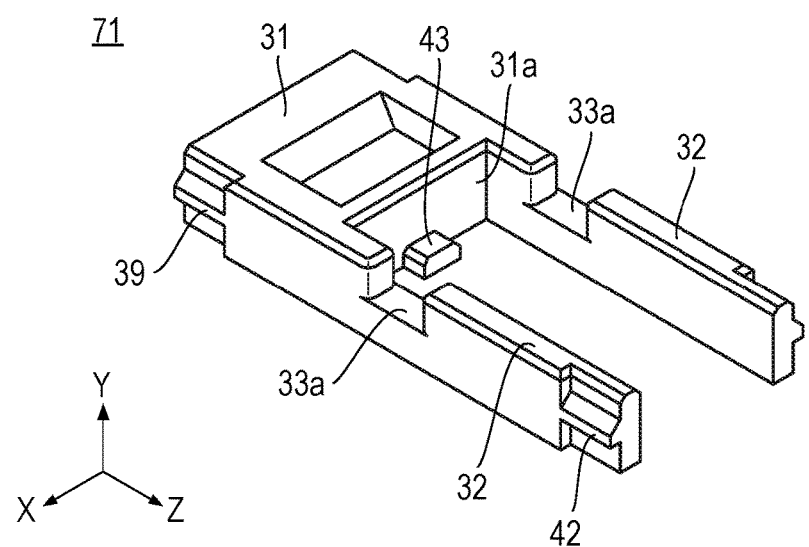
FIG. 8B is a perspective view illustrating a first optical block included in the optical module according to the second embodiment.

The second embodiment is a modification of the configuration for performing positioning in the X direction. As illustrated in FIGS. 8A and 8B, a convex part 43 of a first optical block 71 is fitted in a concave part 63 of a second optical block 81, thus determining a position, in the X direction, of the second optical block 81 with respect to the first optical block 71.

The convex part 43 protrudes from the lateral surface 31a of the base part 31. The concave part 63 is partial absence (recess) on a corner part formed by the lateral surface 51d and a lower surface 51e of the holding part 51. In order to facilitate insertion into the concave part 63, chamfered surfaces are formed on two sides, which are parallel to the Z direction, on an upper surface of the convex part 43. Here, different from the first embodiment, no protrusions 58 are provided on both lateral surfaces 51a and 51b of the holding part 51 in the second embodiment.

Third Embodiment

The third embodiment is a modification of the configuration for performing positioning in the Y direction. A first reference surface and a second reference surface in the third embodiment are different from the first reference surface and the second reference surface in the first embodiment.

Figure 9A:
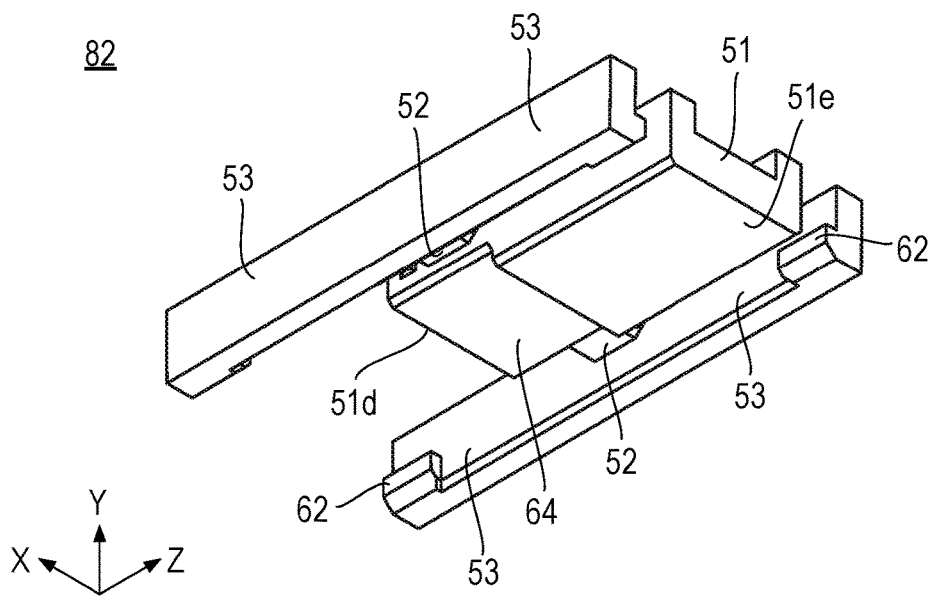
FIG. 9A is a perspective view illustrating a second optical block included in an optical module according to a third embodiment.
Figure 9B:
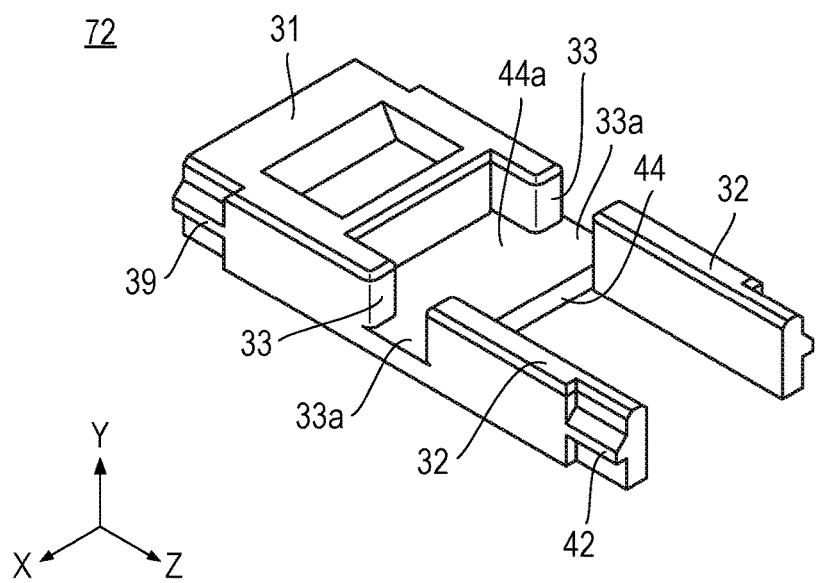
FIG. 9B is a perspective view illustrating a first optical block included in the optical module according to the third embodiment.

As illustrated in FIGS. 9A and 9B, a first optical block 72 includes a plate part 44 which extends from the base part 31 to a part between the two extending parts 32. A surface, which is orthogonal to the Y direction and faces upward, of the plate part 44 is a first reference surface 44a. A second reference surface 64 which is orthogonal to the Y direction and faces downward is formed on the holding part 51 of a second optical block 82. Specifically, the second reference surface 64 is formed on a part which is close to the lateral surface 51d on the lower surface 51e of the holding part 51. The width (the length in the X direction) of the second reference surface 64 is same as the width of the lower surface 51e. The depth (the length in the Y direction) of the concave parts 33 which are formed on the two extending parts 32 in the first optical block 72 is larger than the depth of the concave parts 33 of the first embodiment. The bottom surfaces 33a of the concave parts 33 and the first reference surface 44a are on the same plane.

In short, the first reference surface is formed on a part of the first optical block and this part is positioned in a region surrounded by four locking parts which are the protruding parts 39 and 42.

Fourth Embodiment

Figure 10A:
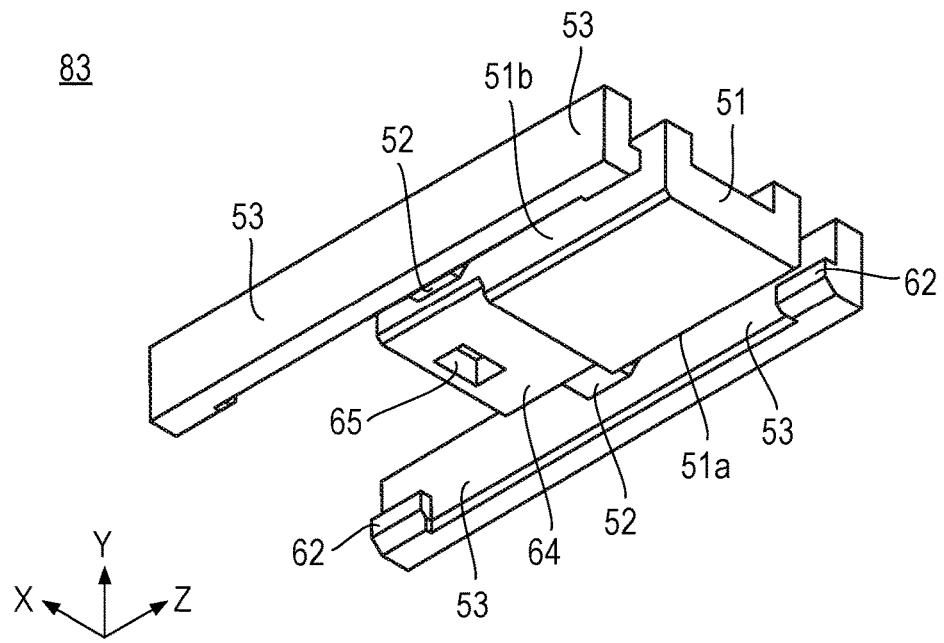
FIG. 10A is a perspective view illustrating a second optical block included in an optical module according to a fourth embodiment.
Figure 10B:
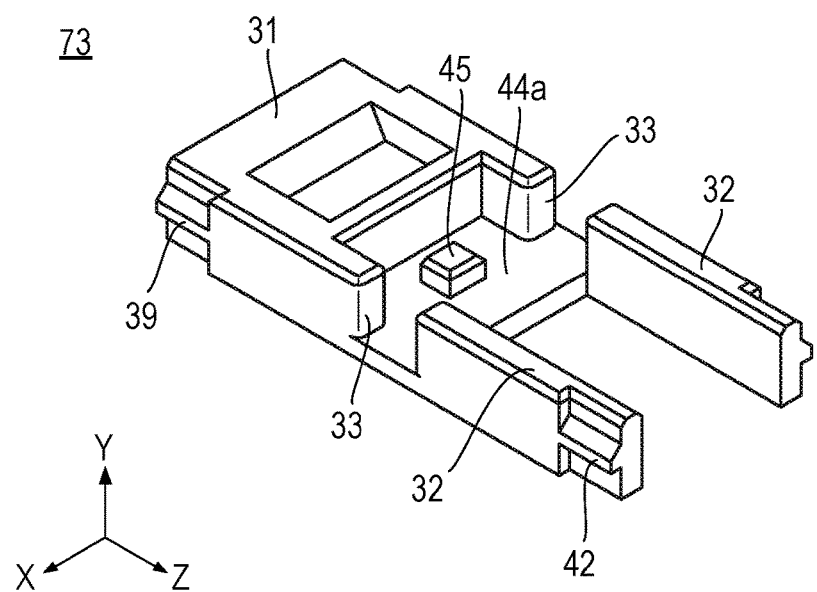
FIG. 10B is a perspective view illustrating a first optical block included in the optical module according to the fourth embodiment.

The fourth embodiment is a modification of the configuration for performing positioning in the X direction and the Z direction. As illustrated in FIGS. 10A and 10B, a convex part 45 formed on a first optical block 73 is fitted in a concave part 65 formed on a second optical block 83, determining a position, in the X direction and the Z direction, of the second optical block 83 with respect to the first optical block 73.

The convex part 45 having a rectangular parallelepiped shape protrudes upward from the first reference surface 44a. The concave part 65 is formed on the second reference surface 64. Chamfered surfaces are formed on two sides, which are parallel to the X direction, and two sides, which are parallel to the Z direction, of an upper surface of the convex part 45 so as to facilitate insertion into the concave part 65. Different from the first and third embodiments, no protrusions 58 and 59 are provided in the fourth embodiment. Here, the configuration in which a concave part is formed on the first reference surface 44a and a convex part which fits in the concave part is formed on the second reference surface 64 is also allowable.

Fifth Embodiment

Figure 11A:
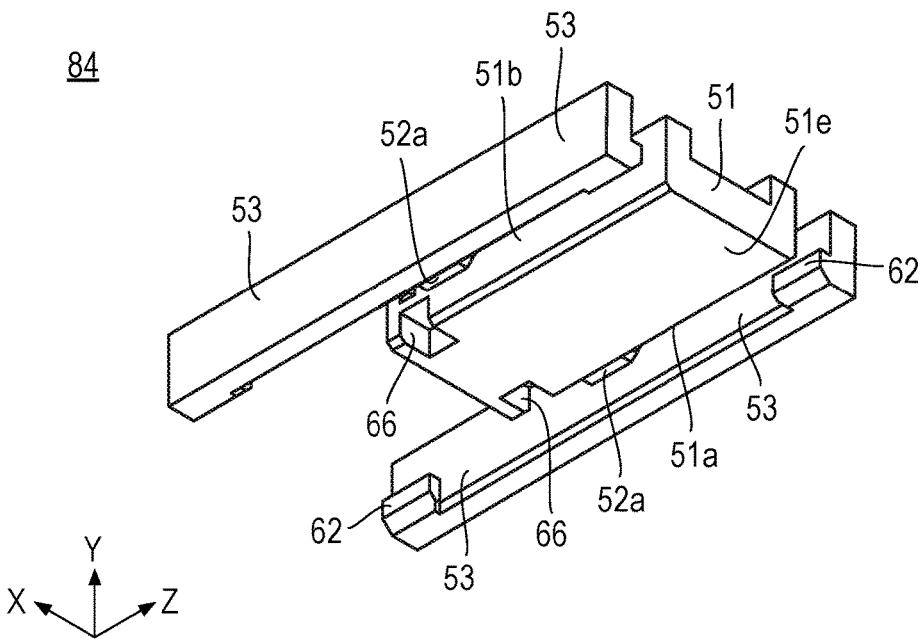
FIG. 11A is a perspective view illustrating a second optical block included in an optical module according to a fifth embodiment.
Figure 11B:
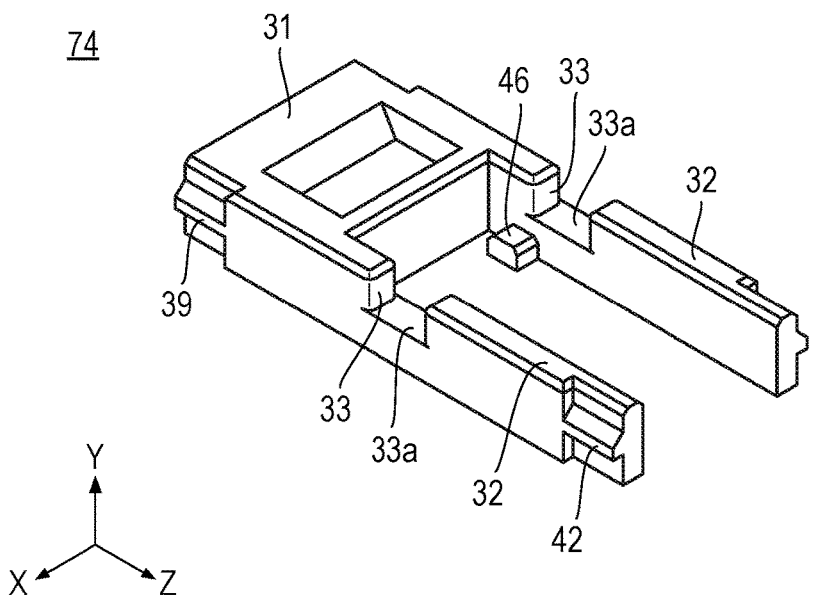
FIG. 11B is a perspective view illustrating a first optical block included in the optical module according to the fifth embodiment.

The fifth embodiment is a modification of the configuration for performing positioning in the Z direction. As illustrated in FIGS. 11A and 11B, two convex parts 46 formed on a first optical block 74 (one convex part 46 which is concealed by the extending part 32 is not illustrated in FIGS. 11A and 11B) are fitted in two concave parts 66 formed on a second optical block 84, determining a position, in the Z direction, of the second optical block 84 with respect to the first optical block 74.

The two convex parts 46 protrude inward (that is, to the X direction) from inner lateral surfaces of the two extending parts 32. One of the two concave parts 66 is partial absence (recess) on a corner part formed by the lateral surface 51a and the lower surface 51e of the holding part 51 and the other of the two concave parts 66 is partial absence (recess) on a corner part formed by the lateral surface 51b and the lower surface 51e of the holding part 51. Chamfered surfaces are formed on two sides, which are parallel to the X direction, of an upper surface of the convex part 46 so as to facilitate insertion into the concave part 66. Different from the first embodiment, no protrusions 59 are provided in the fifth embodiment.

Sixth Embodiment

The sixth embodiment is a modification of the configuration for performing positioning in the Y direction.

Figure 12A:
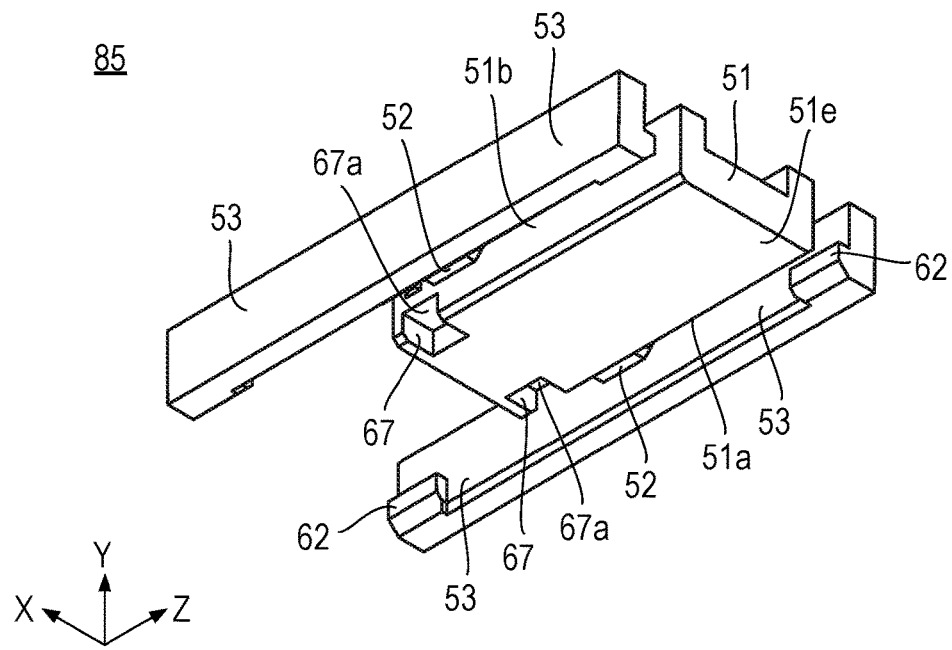
FIG. 12A is a perspective view illustrating a second optical block included in an optical module according to a sixth embodiment.
Figure 12B:
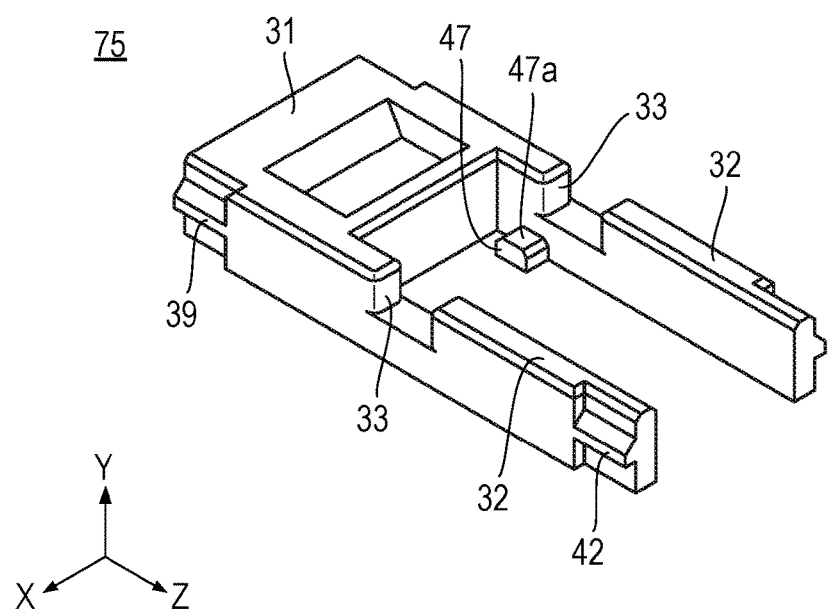
FIG. 12B is a perspective view illustrating a first optical block included in the optical module according to the sixth embodiment.

As illustrated in FIGS. 12A and 12B, a first optical block 75 includes two convex parts 47 (one convex part 47 which is concealed by the extending part 32 is not illustrated in FIGS. 12A and 12B). The two convex parts 47 protrude inward (that is, to the X direction) from inner lateral surfaces of the two extending parts 32. Each of surfaces, which are orthogonal to the Y direction and face upward, of the two convex parts 47 is a first reference surface 47a. A second optical block 85 includes two concave parts 67. One of the two concave parts 67 is partial absence (recess) on the corner part formed by the lateral surface 51a and the lower surface 51e of the holding part 51 and the other of the two concave parts 67 is partial absence (recess) on the corner part formed by the lateral surface 51b and the lower surface 51e of the holding part 51. Each of bottom surfaces, which are orthogonal to the Y direction and face downward, of the two concave parts 67 is a second reference surface 67a.

Seventh Embodiment

The seventh embodiment is a modification of the configuration for performing positioning in the Y direction.

Figure 13A:
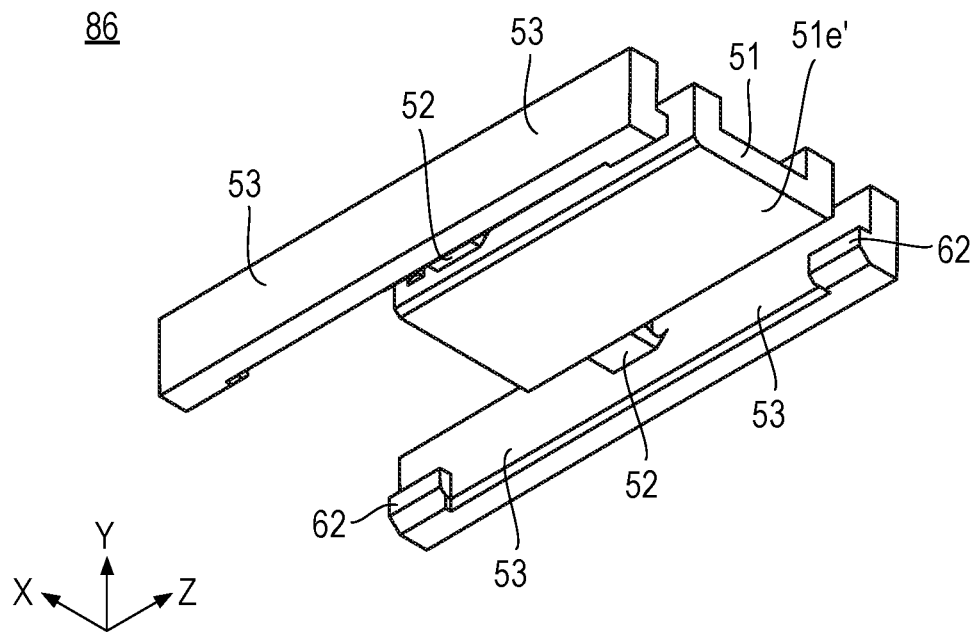
FIG. 13A is a perspective view illustrating a second optical block included in an optical module according to a seventh embodiment.
Figure 13B:
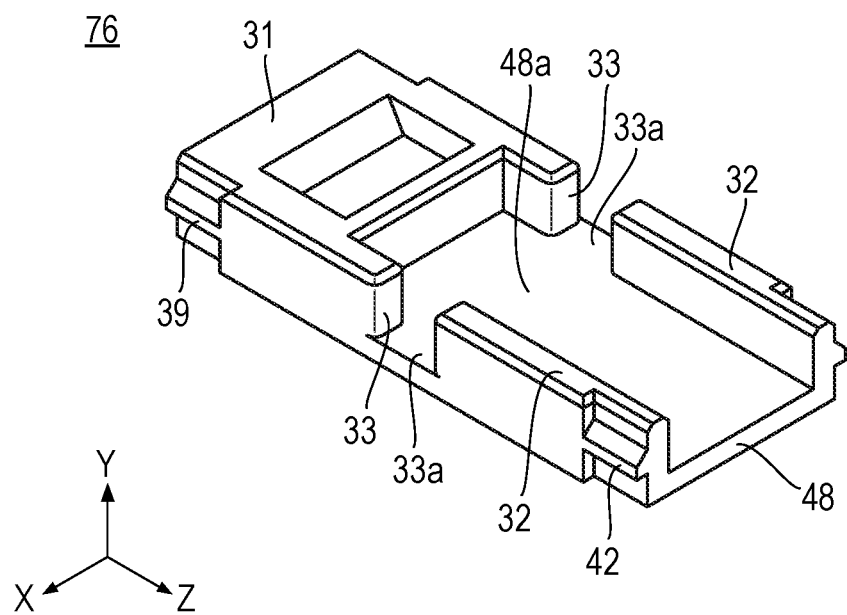
FIG. 13B is a perspective view illustrating a first optical block included in the optical module according to the seventh embodiment.

As illustrated in FIGS. 13A and 13B, a first optical block 76 includes a plate part 48 formed between the two extending parts 32. The plate part 48 couples the two extending parts 32. In this example, the length, in the Z direction, of a coupling part (that is, the length of each part of the plate part 48 at which the plate part 48 connects to the two extending parts 32) is same as the length of each of the extending parts 32. A surface, which is orthogonal to the Y direction and faces upward, of the plate part 48 is a first reference surface 48a. The whole lower surface of the holding part 51 of a second optical block 86 is a second reference surface 51e'. The second reference surface 51e' is a plain which is orthogonal to the Y direction and faces downward. In the first optical block 76, the depth of concave parts 33 which are formed on the two extending parts 32 (the length in the Y direction) is larger than the depth of the concave parts 33 of the first embodiment. The bottom surfaces 33a of the concave parts 33 and the first reference surface 48a are on the same plane.

The foregoing description of the embodiments of the invention has been presented for the purpose of illustration and description. It is not intended to be exhaustive and to limit the invention to the precise form disclosed. Modifications or variations are possible in light of the above teaching.

The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An optical module which optically connects an optical element with an optical fiber, the optical module comprising:
   a first optical block; and
   a second optical block which is assembled with the first optical block, wherein
   the first optical block is an optical block which is to be mounted on a substrate on which the optical element is mounted,
   the second optical block is an optical block configured to hold the optical fiber,
   the first optical block includes
      a base part,
      two extending parts which are opposed to each other, and
      four locking parts,
   the two extending parts extend from the base part in a first direction which is orthogonal to an assembling direction, the assembling direction being a direction in which the second optical block is assembled with the first optical block,
   at least one concave part is formed on each upper surface of the two extending parts,
   two locking parts among the four locking parts are formed on two lateral surfaces of the base part, the lateral surfaces being parallel to the first direction,
   the other two locking parts among the four locking parts are formed on outer lateral surfaces of the two extending parts,
   a reflection surface which reflects light is formed on the base part,
   the reflection surface has an inclination of 45° with respect to the assembling direction,
   a first reference surface which is orthogonal to the assembling direction is formed on a part of the first optical block, the part being positioned in a region surrounded by the four locking parts,
   the second optical block includes
      a holding part which holds the optical fiber,
      two arm parts,
      four spring pieces, and
      four locked parts,
   the two arm parts protrude from the holding part,
   a direction in which each of the two arm parts extends is parallel to a second direction, the second direction being orthogonal to the assembling direction and being orthogonal to the first direction,
   a direction to which one of the two arm parts extends is opposite to a direction to which the other of the two arm parts extends,
   two spring pieces among the four spring pieces extend parallel to the first direction from an end of one of the two arm parts,
   a direction to which one of the two spring pieces among the four spring pieces extends is opposite to a direction to which the other of the two spring pieces among the four spring pieces extends,
   the other two spring pieces among the four spring pieces extend parallel to the first direction from an end of the other of the two arm parts,
   a direction to which one of the other two spring pieces among the four spring pieces extends is opposite to a direction to which the other of the other two spring pieces among the four spring pieces extends,
   the four locked parts are formed on free ends of the four spring pieces,
   the four locked parts have a configuration in which the four locking parts are hooked on the four locked parts in a state that the second optical block is assembled with the first optical block,
   a second reference surface which is orthogonal to the assembling direction is formed on a part of the second optical block, the part being a part opposed to the first reference surface in the state that the second optical block is assembled with the first optical block,
   in the state that the second optical block is assembled with the first optical block, the holding part is positioned between the two extending parts,
   in the state that the second optical block is assembled with the first optical block, each of the two arm parts is accommodated in the concave part,
   in the state that the second optical block is assembled with the first optical block, the second reference surface is pressed against the first reference surface by a spring force of the four spring pieces, and
   in the state that the second optical block is assembled with the first optical block, an optical path between the base part and the holding part is parallel to the first direction and the optical path is included in an optical path between the reflection surface and the optical fiber.

2. The optical module according to claim 1, wherein the locking parts are protruding parts and the locked parts are lances.

3. The optical module according to claim 1, wherein the two arm parts are positioned on parts close to a surface of the holding part, the surface facing to the base part, in the state that the second optical block is assembled with the first optical block.

4. The optical module according to claim 2, wherein the two arm parts are positioned on parts close to a surface of the holding part, the surface being opposed to the base part in the state that the second optical block is assembled with the first optical block.

5. The optical module according to claim 1, wherein the first reference surface is a bottom surface of the concave part and the second reference surface is each lower surface of the two arm parts.

6. The optical module according to claim 2, wherein the first reference surface is a bottom surface of the concave part and the second reference surface is each lower surface of the two arm parts.

7. The optical module according to claim 3, wherein the first reference surface is a bottom surface of the concave part and the second reference surface is each lower surface of the two arm parts.

8. The optical module according to claim 4, wherein the first reference surface is a bottom surface of the concave part and the second reference surface is each lower surface of the two arm parts.

* * * * *